United States Patent
Sugimoto

(10) Patent No.: US 10,358,992 B2
(45) Date of Patent: Jul. 23, 2019

(54) VEHICLES AND METHODS FOR DETERMINING MISFIRE OF AN ENGINE

(71) Applicant: Toyota Jidosha Kabushiki Kaisha, Toyota-shi, Aichi-ken (JP)

(72) Inventor: Hitoki Sugimoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 135 days.

(21) Appl. No.: 15/214,659

(22) Filed: Jul. 20, 2016

(65) Prior Publication Data

US 2017/0037800 A1 Feb. 9, 2017

(30) Foreign Application Priority Data

Aug. 5, 2015 (JP) .................................. 2015-154923

(51) Int. Cl.
| | |
|---|---|
| *F02D 41/02* | (2006.01) |
| *F02D 41/24* | (2006.01) |
| *F02D 41/14* | (2006.01) |
| *G01M 15/11* | (2006.01) |
| *F02D 41/12* | (2006.01) |

(52) U.S. Cl.
CPC ..... *F02D 41/0225* (2013.01); *F02D 41/1498* (2013.01); *F02D 41/2441* (2013.01); *F02D 41/2451* (2013.01); *G01M 15/11* (2013.01); *F02D 41/123* (2013.01); *F02D 2200/1015* (2013.01); *F02D 2250/24* (2013.01)

(58) Field of Classification Search
CPC ............... F02D 41/021; F02D 41/0225; F02D 41/1497; F02D 41/1498; F02D 41/2441; F02D 41/2448; F02D 41/2451; F02D 41/123; F02D 2200/101; F02D 2200/1012; F02D 2200/1015; G01M 15/11
USPC ............. 73/114.02–114.04, 115.02; 701/104, 701/111–112
See application file for complete search history.

(56) References Cited

U.S. PATENT DOCUMENTS

| | | | | |
|---|---|---|---|---|
| 5,263,453 A | * | 11/1993 | Wakahara | G01M 15/11 123/436 |
| 5,357,790 A | * | 10/1994 | Hosoya | F02D 41/22 123/436 |
| 5,377,536 A | * | 1/1995 | Angermaier | F02P 17/00 123/436 |

(Continued)

FOREIGN PATENT DOCUMENTS

| | | |
|---|---|---|
| JP | 07-293316 A | 11/1995 |
| JP | 2000-120488 A | 4/2000 |

*Primary Examiner* — Erick R Solis
*Assistant Examiner* — Robert A Werner
(74) *Attorney, Agent, or Firm* — Dinsmore & Shohl LLP

(57) ABSTRACT

A controller is configured to perform a control process including steps of: setting a learning execution flag to be on when a learning process has not been completed in a present trip, an engine is in a fuel cut state, and a transmission gear position is a second or lower gear position; setting the learning execution flag to be off when the transmission gear position is in a third or higher gear position; controlling to bring the engine into the fuel cut state when the engine is not in the fuel cut state, an accelerator pedal is in an accelerator off state, and the transmission gear position is the second or lower gear position; and setting the learning execution flag to be on.

4 Claims, 12 Drawing Sheets

(56) References Cited

U.S. PATENT DOCUMENTS

| | | | | |
|---|---|---|---|---|
| 5,560,341 A * | 10/1996 | Machida | ............... | G01M 15/11 |
| | | | | 123/479 |
| 5,587,909 A * | 12/1996 | Matsumoto | ........... | G01L 19/147 |
| | | | | 701/111 |
| 5,639,960 A * | 6/1997 | Nakagawa | ............. | G01M 15/11 |
| | | | | 701/110 |
| 5,670,713 A * | 9/1997 | Machida | ............... | G01M 15/11 |
| | | | | 123/406.27 |
| 5,906,651 A * | 5/1999 | Amano | ................ | G01M 15/11 |
| | | | | 123/436 |
| 8,136,390 B2 * | 3/2012 | Arakawa | ............... | G01M 15/11 |
| | | | | 73/114.02 |

* cited by examiner

FIG.5

|     | C1 | C2 | C3 | B1 | B2  | F1 |
|-----|----|----|----|----|-----|----|
| 1st | O  |    |    |    | (O) | △  |
| 2nd | O  |    |    | O  |     |    |
| 3rd | O  | O  |    |    |     |    |
| 4th |    | O  |    | O  |     |    |
| R   |    |    | O  |    | O   |    |
| N   |    |    |    |    |     |    |

O : ENGAGEMENT
(O): ENGAGEMENT UPON ENGINE BRAKE
△ : ENGAGEMENT ONLY DURING DRIVING

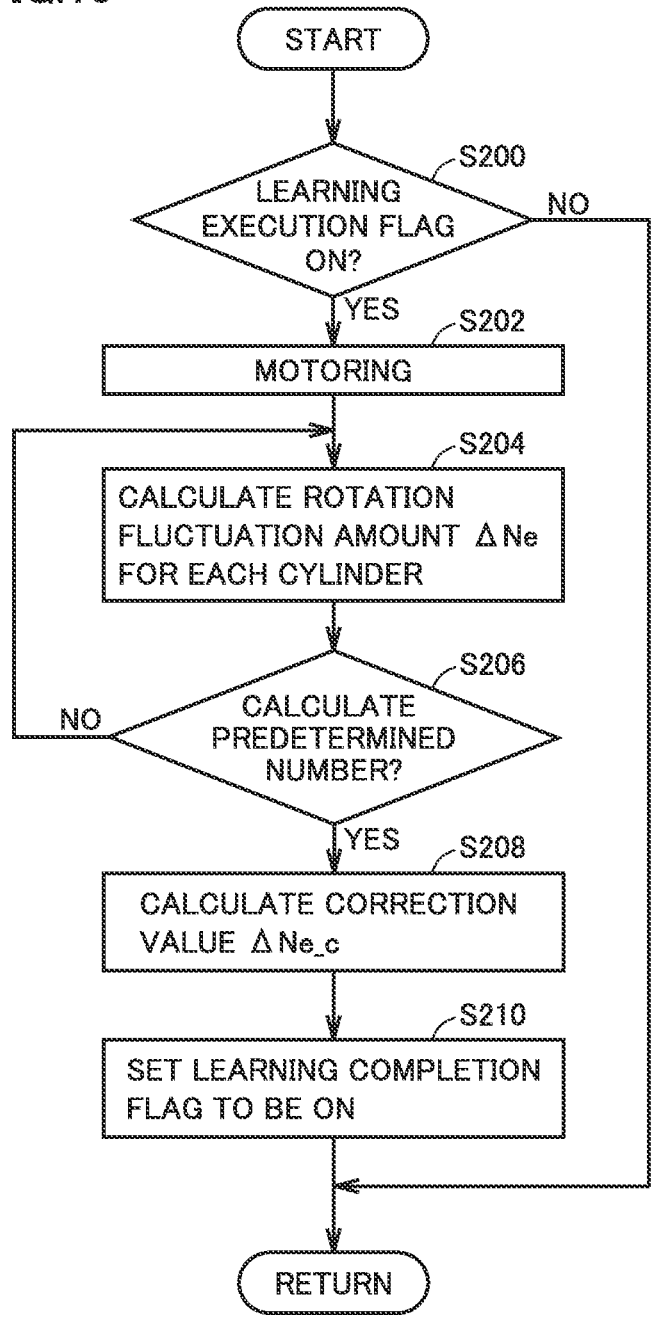

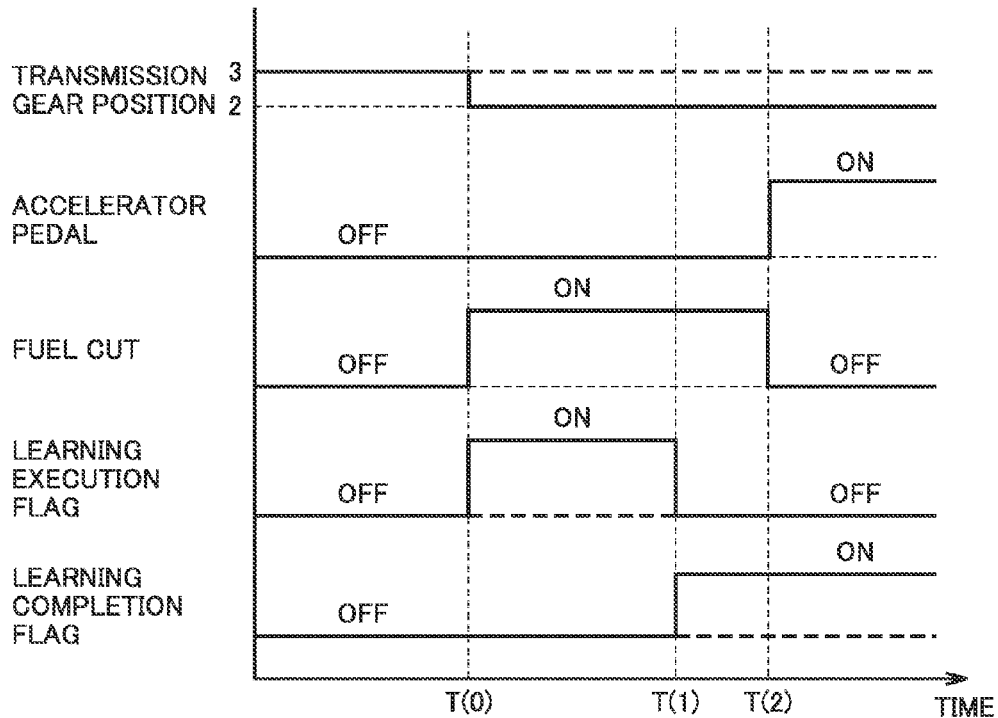
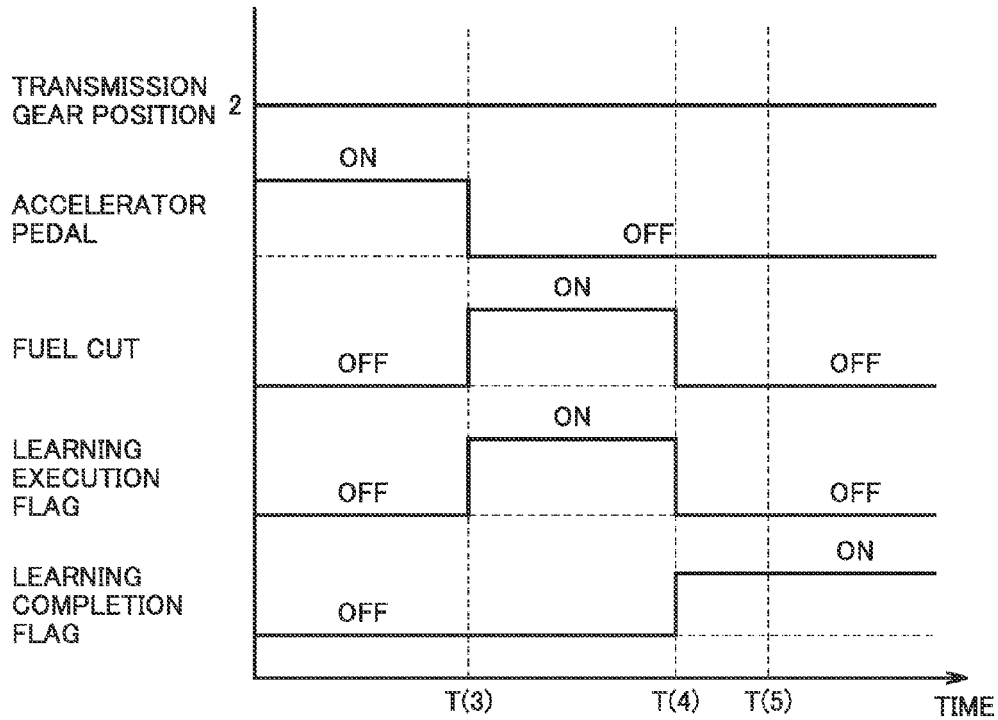

VEHICLES AND METHODS FOR DETERMINING MISFIRE OF AN ENGINE

CROSS-REFERENCE TO RELATED APPLICATIONS

This application claims priority to Japanese Patent Application No. 2015-154923 filed on Aug. 5, 2015, the entire contents of which are hereby incorporated by reference.

BACKGROUND

Field

The present disclosure relates to misfire determination for an engine of a vehicle including the engine, a motor configured to be capable of rotating an output shaft of the engine, and a transmission provided between the engine and a driving wheel.

Description of the Background Art

Japanese Patent Laying-Open No. 7-293316 discloses misfire determination for an engine. Specifically, Japanese Patent Laying-Open No. 7-293316 discloses a technique of learning a correction value for generation cycle of a reference signal output from a crank angle sensor under conditions that a driving state is such that the engine is in a fuel cut state and the rotation speed of the engine is stable. The correction value is used for misfire determination.

SUMMARY

However, when performing such learning about misfire determination for an engine as mentioned above in a vehicle configured such that an engine is connected to a driving wheel via a transmission, precision in learning may be deteriorated due to a large influence of disturbance (input from a road surface during a traveling on a rough road or the like) transferred from the driving wheel to the engine via the transmission. The influence of such disturbance is particularly notable when the transmission gear position of the transmission is a high-speed gear position. This is because when the transmission gear position of the transmission is such a high-speed transmission gear position, inertia at the driving wheel becomes larger than inertia at the output shaft of the engine.

An object of the present disclosure is to provide a vehicle configured to suppress deterioration of precision in learning about misfire determination of an engine.

A vehicle according to an aspect of the present disclosure includes: an engine having a plurality of cylinders; a motor configured to rotate an output shaft of the engine; a transmission provided between the engine and a driving wheel; a detector configured to detect a rotation angle of an output shaft of the engine; and a controller. The controller is configured to control an operation of the engine and an operation of the motor. The controller is configured to calculate a deviation between a first rotation time and a second rotation time as a rotation fluctuation amount. The first rotation time is a time required for the output shaft to rotate by a predetermined angle after an ignition timing of the first cylinder of the engine during an operation of the engine. The second rotation time is a time required for the output shaft to rotate by the predetermined angle after an ignition timing of a second cylinder, the second cylinder being a cylinder ignition order of which is one cylinder before the first cylinder. The controller is configured to determine whether or not misfire has occurred in the engine in accordance with whether or not the calculated rotation fluctuation amount is larger than a misfire determination value. When a gear ratio of the transmission is equal to or larger than a threshold value, the controller is configured to perform a learning process in which the deviation between the first rotation time and the second rotation time is set as a correction value for the rotation fluctuation amount, the deviation being calculated by rotating the output shaft using the motor with fuel injection being stopped in the engine. When the gear ratio is smaller than the threshold value, the controller is configured not to perform the learning process.

In this way, the learning process is performed when the gear ratio of the transmission is equal to or larger than the threshold value, i.e., when an influence of disturbance from the driving wheels is small. The learning process is not performed when the gear ratio of the transmission is smaller than threshold value, i.e., when the influence of the disturbance from the driving wheels is large. Accordingly, precision in learning can be suppressed from being deteriorated.

When the gear ratio is equal to or larger than the threshold value, the controller is configured to set a condition for stopping the fuel injection such that the fuel injection is more likely to be stopped as compared with a case where the gear ratio is smaller than the threshold value.

In this way, when the gear ratio of the transmission is equal to or larger than the threshold value, the condition for stopping the fuel injection is set such that the fuel injection is more likely to be stopped as compared with a case where the gear ratio of the transmission is smaller than the threshold value. This provides more opportunities for learning.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 5 shows an engagement operation table of the transmission.

FIG. 10 is a flowchart showing the learning process performed by the controller.

FIG. 11 is a (first) timing chart for illustrating the operation of the controller.

FIG. 12 is a (second) timing chart for illustrating the operation of the controller.

DETAILED DESCRIPTION

Figure 1:
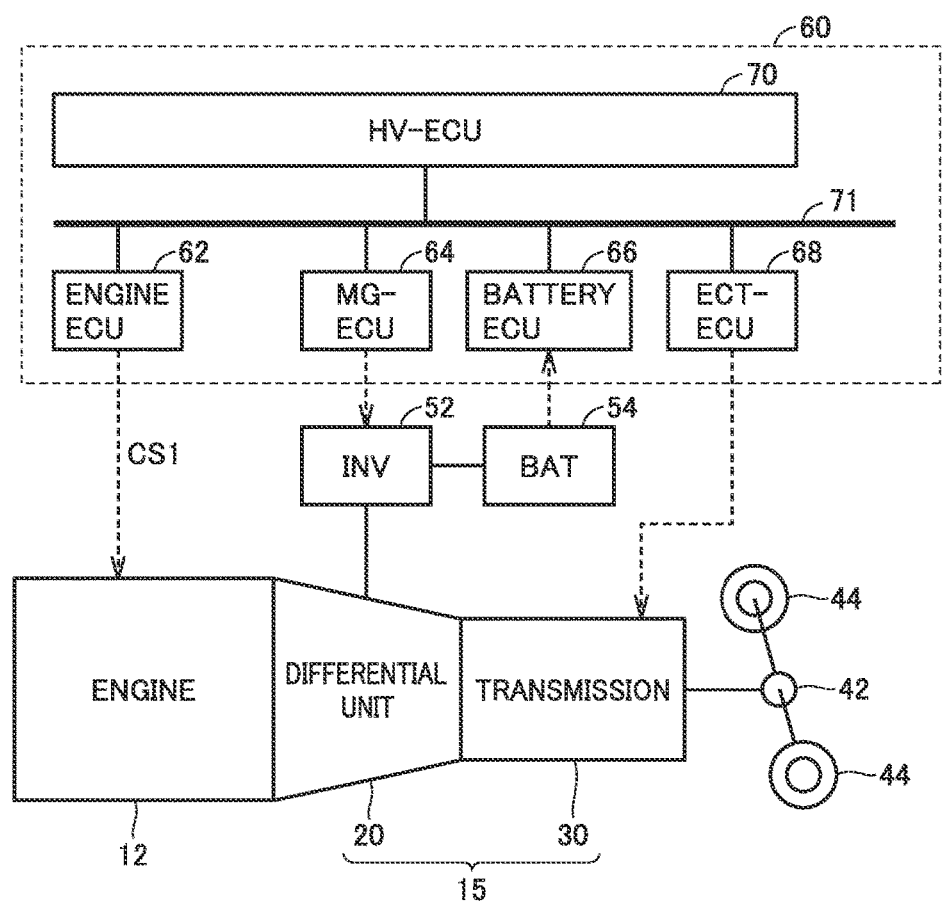
FIG. 1 is a schematic configuration diagram of a motive power transfer system of the vehicle and a control system therefor.

The following describes an embodiment of the present disclosure with reference to figures. In the following description, the same parts are denoted with the same reference numerals. Their names and functions are also the same. Therefore, a detailed description thereof will not be repeated.

As shown in FIG. 1, a vehicle 10 includes an engine 12, a transmission unit 15, a differential gear unit 42, and driving wheels 44. Transmission unit 15 includes a differential unit 20 and a transmission 30. Moreover, vehicle 10 further includes an inverter 52, a power storage device 54, and a controller 60. Vehicle 10 is a hybrid vehicle employing engine 12 and a motor generator MG2 as driving sources as described below.

Engine 12 is an internal combustion engine configured to generate motive power by converting (i) heat energy resulting from combustion of fuel into (ii) kinetic energy for moving elements such as a piston and a rotor. Differential unit 20 is coupled to engine 12. Differential unit 20 includes: a motor generator driven by inverter 52; and a power split device configured to split the output of engine 12 for a transfer member connected to transmission 30 and for the motor generator. Differential unit 20 is configured to be capable of continuously changing a ratio (gear ratio) of the rotation speed of the output shaft of engine 12 and the rotation speed of the transfer member connected to transmission 30, by appropriately controlling an operation point of the motor generator. Differential unit 20 serves as a stepless transmission. Details of the configuration of differential unit 20 will be described later.

Transmission 30 is coupled to differential unit 20. Transmission 30 is configured to be capable of changing a ratio (gear ratio) of the rotation speed of the transfer member (input shaft of transmission 30) connected to differential unit 20 and the rotation speed of the driving shaft (output shaft of transmission 30) connected to differential gear unit 42. Transmission 30 may be an automatic transmission capable of transferring motive power in a predetermined manner (capable of operating transmission 30) by engaging a friction engagement element (clutch), which is actuated with hydraulic pressure. Transmission 30 may be a step type automatic transmission capable of stepwisely changing the gear ratio by engaging or disengaging a plurality of friction engagement elements (clutches and brakes), which are actuated with hydraulic pressure, in a predetermined combination, for example. Alternatively, transmission 30 may be a stepless type automatic transmission that has a starting clutch and that is capable of continuously changing the gear ratio.

Moreover, the gear ratio of transmission unit 15 (total gear ratio between the output shaft of engine 12 and the driving shaft) is determined by the gear ratio of transmission 30 and the gear ratio of differential unit 20. It should be noted that the detailed configuration of transmission 30 will be also described together with differential unit 20. Differential gear unit 42 is coupled to the output shaft of transmission 30 and transfers motive power from transmission 30 to driving wheels 44.

Inverter 52 is controlled by controller 60 to control driving of the motor generator included in differential unit 20. Inverter 52 is constituted of a bridge circuit including three-phase power semiconductor switching elements, for example. It should be noted that although not shown particularly, a voltage converter may be provided between inverter 52 and power storage device 54.

Power storage device 54 is a rechargeable DC power source and is representatively constituted of a secondary battery such as a lithium-ion battery or a nickel-metal hydride battery. It should be noted that instead of the secondary battery, power storage device 54 may be constituted of a power storage element such as an electric double layer capacitor.

Controller 60 includes an engine ECU (Electronic Control Unit) 62, an MG-ECU 64, a battery ECU 66, an ECT-ECU 68, and an HV-ECU 70. Each of these ECUs includes a CPU (Central Processing Unit), a storage device, an input/output buffer, and the like (all of which are not shown). Each ECU performs predetermined control. Processing for the control performed by each ECU is not limited to software processing, and can be implemented by dedicated hardware (electronic circuit). Each ECU is connected to a communication line (bus) 71 to send/receive a signal thereto/therefrom. These ECUs are separate controllers.

Engine ECU 62 generates a control signal for driving engine 12, based on an engine torque command or the like received from HV-ECU 70. Engine ECU 62 outputs the generated control signal to engine 12. MG-ECU 64 generates a control signal for driving inverter 52. MG-ECU 64 outputs the generated control signal to inverter 52.

Based on the voltage and/or current of power storage device 54, battery ECU 66 estimates a state of charge (represented by a SOC (State Of Charge) value, which indicates a percentage of an amount of stored electric power at present relative to that in the fully charged state) of power storage device 54. Battery ECU 66 outputs the estimated value to HV-ECU 70. Based on a torque capacity command or the like received from HV-ECU 70, ECT-ECU 68 generates a hydraulic pressure command for controlling transmission 30. ECT-ECU 68 outputs the generated hydraulic pressure command to transmission 30.

HV-ECU 70 receives signals from a shift lever sensor and various other sensors and generates various commands for controlling devices of vehicle 10. As representative control performed by HV-ECU 70, HV-ECU 70 performs traveling control based on an amount of operation on an accelerator pedal, vehicle speed, or the like to control engine 12 and transmission unit 15 to be brought into a desired state for traveling. Moreover, HV-ECU 70 performs transmission control based on a traveling state of the vehicle (accelerator position, vehicle speed, or the like), a position of the shift lever, or the like to control differential unit 20 and transmission 30 to be brought into a desired transmission state. Details of this transmission control will be described later.

Figure 2:
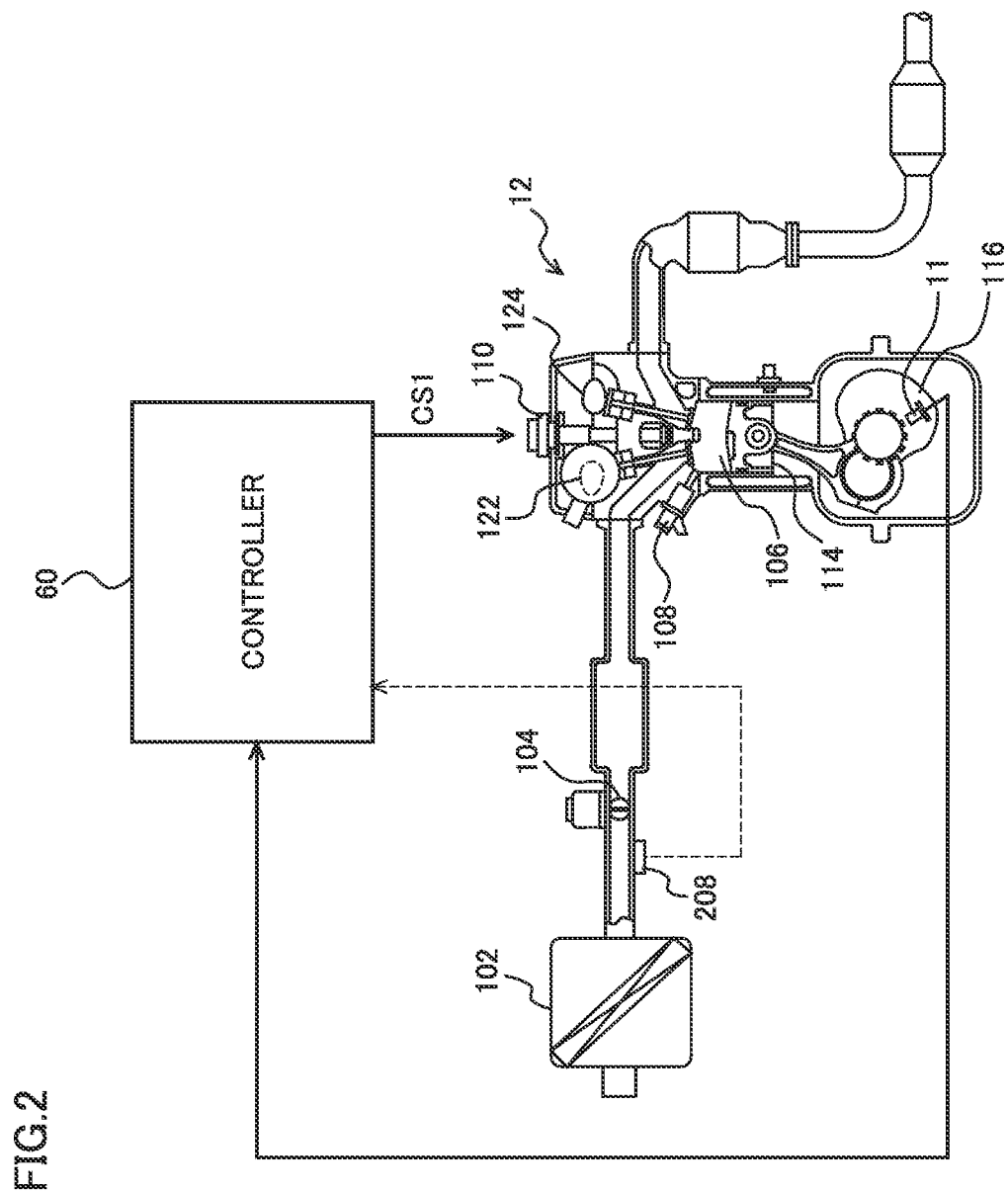
FIG. 2 shows an engine configuration.

For example, engine 12 is an internal combustion engine such as a gasoline engine or a diesel engine. As shown in FIG. 2, engine 12 includes an air cleaner 102, a throttle valve 104, a plurality of cylinders 106, an injector 108 configured to supply fuel to each of the plurality of cylinders 106, an ignition plug 110, a piston 114, and an output shaft (crankshaft) 116. In the present embodiment, as one example, it is illustrated that engine 12 is a 4-cylinder engine; however, the number of cylinders is not particularly limited to 4.

Air is taken into engine 12 via air cleaner 102. An amount of intake air is adjusted by throttle valve 104. Throttle valve 104 is an electronic throttle valve driven by a motor.

The air is mixed with fuel in each cylinder 106 (combustion chamber). The fuel is directly injected from injector 108 to cylinder 106. That is, a nozzle of injector 108 is provided in cylinder 106. The fuel is injected from the air intake side (side from which air is introduced) of cylinder 106.

The fuel is injected in an intake stroke. It should be noted that a time at which fuel is injected is not limited to the intake stroke. Moreover, in the present embodiment, it is illustrated that engine 12 is a direct-injection engine in which the nozzle of injector 108 is provided in cylinder 106; however, an injector for port injection may be provided in addition to injector 108 for direct injection. Furthermore, only an injector for port injection may be provided.

The air-fuel mixture in cylinder 106 is ignited by ignition plug 110 and is combusted. The air-fuel mixture after the combustion, i.e., exhaust gas is purified by a three-way catalyst or the like, and is then emitted to outside of the vehicle. The combustion of the air-fuel mixture presses down piston 114 to rotate output shaft 116.

Engine 12 is controlled based on a control signal CS1 from controller 60 (for example, engine ECU 62). Controller 60 controls a throttle opening angle, an ignition timing, a fuel injection timing, and a fuel injection amount in order to bring engine 12 into a desired driving state. Controller 60 receives a signal from crank angle sensor 11.

Crank angle sensor 11 outputs a signal indicating rotation speed Ne (hereinafter, referred to as "engine rotation speed") of output shaft 116 and the rotation angle of output shaft 116.

Figure 3:
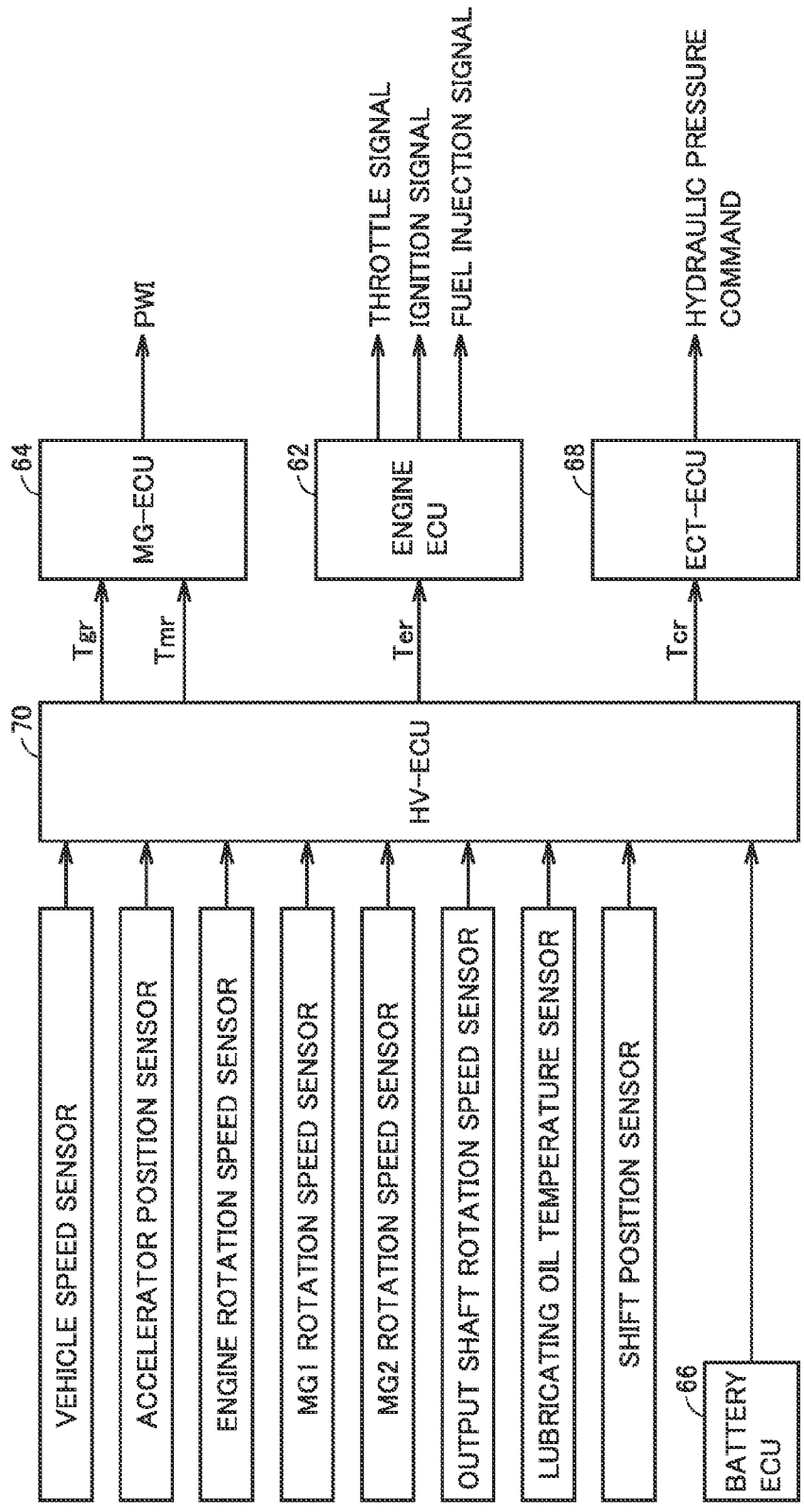
FIG. 3 shows main signals and commands sent to and received from a controller.

FIG. 3 shows main signals and commands sent to and received from controller 60 shown in FIG. 1. With reference to FIG. 3, HV-ECU 70 receives a signal from a vehicle speed sensor, a signal from an accelerator position sensor, a signal from an engine rotation speed sensor, a signal from an MG1 rotation speed sensor 27, a signal from an MG2 rotation speed sensor 28, and a signal from an output shaft rotation speed sensor 37. The accelerator position sensor detects an amount of operation (accelerator position) on the accelerator pedal. The engine rotation speed sensor detects the rotation speed of engine 12. MG1 rotation speed sensor 27 detects the rotation speed of motor generator MG1 (described below) included in differential unit 20. MG2 rotation speed sensor 28 detects the rotation speed of motor generator MG2 (described below) included in differential unit 20. Output shaft rotation speed sensor 37 detects rotation speed (hereinafter, referred to as "output shaft rotation speed") No of the output shaft of transmission 30. Furthermore, HV-ECU 70 receives a signal from a lubricating oil temperature sensor, and a signal from a shift position sensor. The lubricating oil temperature sensor detects the temperature of the lubricating oil in each of differential unit 20 and transmission 30. The shift position sensor detects the position of the shift lever. Furthermore, HV-ECU 70 receives, from battery ECU 66, a signal indicating the SOC value of power storage device 54.

Engine ECU 62 generates control signal CS1, which includes a throttle signal, an ignition signal, a fuel injection signal, and the like for driving engine 12, and outputs it to engine 12. MG-ECU 64 generates a signal PWI for driving motor generators MG1, MG2 using inverter 52. MG-ECU 64 outputs generated signal PWI to inverter 52. ECT-ECU 68 generates a hydraulic pressure command such that transmission 30 has a torque capacity corresponding to a torque capacity command Tcr. ECT-ECU 68 outputs the generated hydraulic pressure command to transmission 30.

Figure 4:
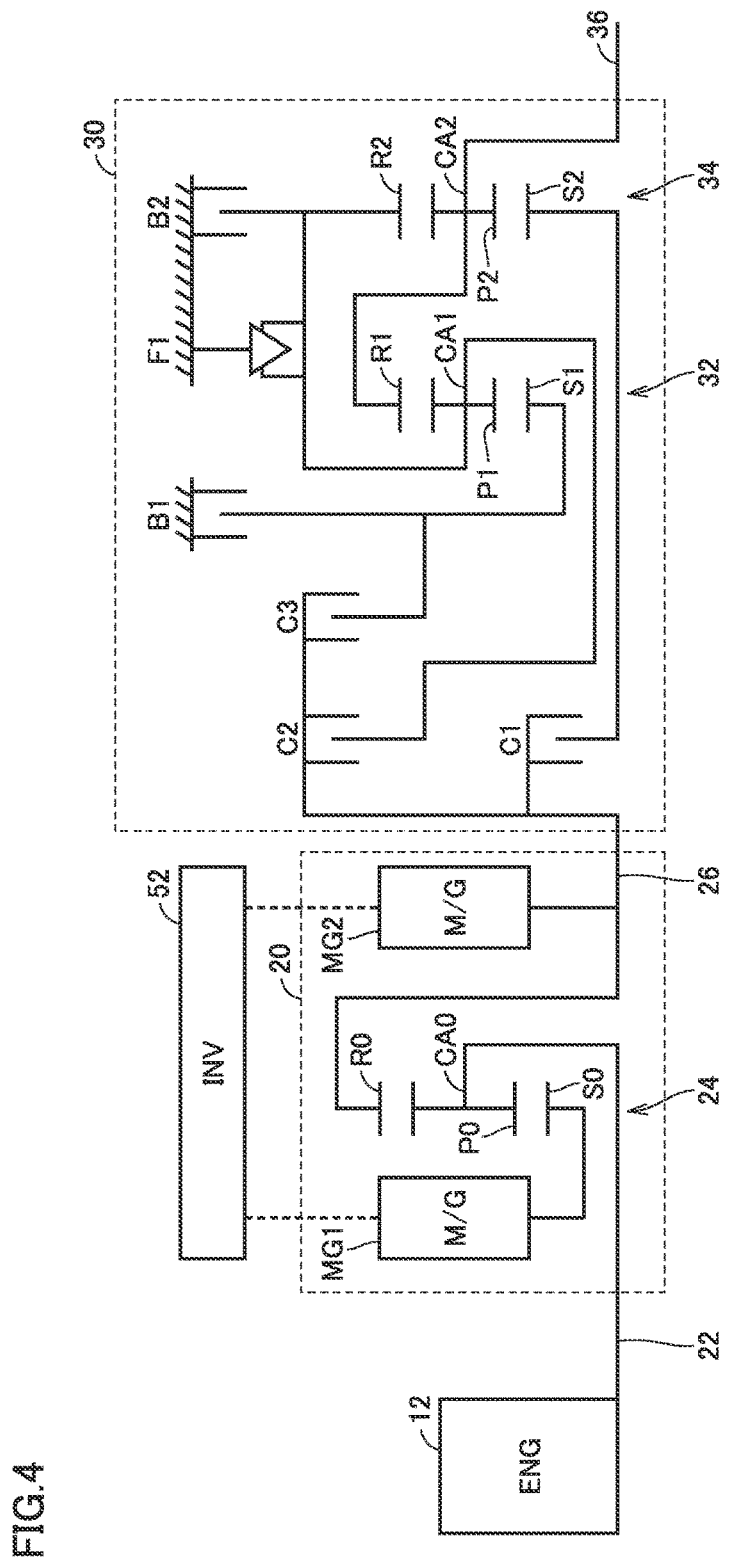
FIG. 4 shows respective configurations of a differential unit and a transmission.

FIG. 4 shows respective configurations of differential unit 20 and transmission 30 shown in FIG. 1. It should be noted that in this embodiment, each of differential unit 20 and transmission 30 is configured to be symmetrical with respect to the axial center. Hence, in FIG. 4, illustration of lower portions of differential unit 20 and transmission 30 is omitted.

With reference to FIG. 4, differential unit 20 includes motor generators MG1, MG2, and power split device 24. Each of motor generators MG1, MG2 is an AC motor, such as a permanent-magnet type synchronous motor including a rotor having a permanent magnet embedded therein. Motor generators MG1, MG2 are driven by inverter 52.

Motor generator MG1 is provided with MG1 rotation speed sensor 27 configured to detect the rotation speed of the rotation shaft of motor generator MG1. Motor generator MG2 is provided with MG2 rotation speed sensor 28 configured to detect motor rotation speed Nm2.

Power split device 24 is constituted of a single pinion type planetary gear, and includes a sun gear S0, a pinion gear P0 a carrier CA0, and a ring gear R0. Carrier CA0 is coupled to an input shaft 22, i.e., the output shaft of engine 12, and supports pinion gear P0 rotatably and revolvably. Sun gear S0 is coupled to the rotation shaft of motor generator MG1. Ring gear R0 is configured to be coupled to transfer member 26 and be engaged with sun gear S0 via pinion gear P0. The rotation shaft of motor generator MG2 is connected to transfer member 26. That is, ring gear R0 is also connected to the rotation shaft of motor generator MG2.

Power split device 24 serves as a differential device by rotating sun gear S0, carrier CA0 and ring gear R0 relative to one another. With the differential function of power split device 24, motive power output from engine 12 is distributed to sun gear S0 and ring gear R0. Motor generator MG1 operates as an electric power generator using the motive power distributed to sun gear S0. Electric power generated by motor generator MG1 is supplied to motor generator MG2 or is stored in power storage device 54 (FIG. 1). Motor generator MG1 generates electric power using motive power split by power split device 24, and motor generator MG2 is driven using electric power generated by motor generator MG1. Accordingly, differential unit 20 can implement a transmission function.

Transmission 30 includes single pinion type planetary gears 32, 34, clutches C1 to C3, brakes B1, B2, and a one-way clutch F1. Planetary gear 32 includes a sun gear S1, a pinion gear P1, a carrier CA1, and a ring gear R1. Planetary gear 34 includes a sun gear S2, a pinion gear P2, a carrier CA2, and a ring gear R2.

Each of clutches C1 to C3 and brakes B1, B2 is a friction engagement device configured to operate using a hydraulic pressure. Clutches C1 to C3 and brakes B1, B2 are constituted of a multiplate wet clutch in which a plurality of overlapped friction plates are pressed by way of hydraulic pressure, a band brake in which one end of a band wound around the outer circumferential surface of a rotating drum is tightened by hydraulic pressure, and the like. One-way clutch F1 supports carrier CA1 and ring gear R2, which are connected to each other, such that they can be rotated in one direction and cannot be rotated in the other direction.

In this transmission 30, the respective engagement devices, i.e., clutches C1 to C3, brakes B1, B2, and one-way clutch F1 are engaged in accordance with an engagement operation table shown in FIG. 5, thereby selectively forming first to fourth gear positions and a reverse gear position. It should be noted that in FIG. 5, a circle mark represents an engagement state, a circle mark in parentheses represents that engagement is attained during engine brake, and a triangle mark represents that engagement is attained only during driving, and a blank represents a disengagement state. Moreover, by bringing each of the engagement devices, i.e., clutches C1 to C3 and brakes B1, B2 into the disengagement state, a neutral state (state in which transfer of motive power is blocked) can be formed.

With reference to FIG. 4 again, differential unit 20 and transmission 30 are coupled to each other by transfer member 26. Then, output shaft 36 coupled to carrier CA2 of planetary gear 34 is coupled to differential gear unit 42 (FIG. 1). Output shaft 36 of transmission 30 is provided with an output shaft rotation speed sensor 37, which is configured to detect output shaft rotation speed No.

For example, when clutch C1 and brake B1 are engaged and the other clutches and brakes are disengaged as shown in the engagement operation table of FIG. 5, the second gear position is formed in transmission 30. Accordingly, the gear ratio of transmission 30 becomes a gear ratio corresponding to the second gear position. Thus, by engaging or disengaging clutches C1 to C3 and brakes B1, B2 in transmission 30 in accordance with the engagement operation table of FIG. 4, the first to fourth gear positions, the reverse gear position, and the neutral state can be formed.

On the other hand, in differential unit 20, rotation of each of motor generators MG1, MG2 is controlled appropriately. Accordingly, stepless transmission is implemented in which the rotation speed of ring gear R0, that is, the rotation speed of transfer member 26 can be changed continuously with respect to the rotation speed of engine 12 coupled to carrier CA0. To such a differential unit 20, transmission 30, which is capable of changing the gear ratio between transfer member 26 and output shaft 36, is connected. Accordingly, the stepless transmission function by differential unit 20 can be provided while attaining a small gear ratio of differential unit 20. As a result, loss in motor generators MG1, MG2 can be small.

In engine 12 provided in vehicle 10 configured as described above, misfire may occur due to various reasons such as adhesion of carbon, oil, or fuel to ignition plug 110. When misfire occurs in engine 12, torque fluctuation occurs and fuel not combusted may be exhausted to outside. Hence, it is necessary to detect occurrence of such misfire at an early stage. To address this, controller 60 performs diagnosis (misfire diagnosis) as to whether or not misfire has occurred in engine 12.

Controller 60 measures a rotation time required for a rotation between predetermined rotation angles for each cylinder. Controller 60 calculates, as a rotation fluctuation amount ΔNe, a difference between (i) a rotation time of a cylinder for which detection of misfire is performed and (ii) a rotation time of a cylinder ignition order of which is one cylinder before the cylinder for which the detection of misfire is performed. When misfire occurs, no combustion occurs after an ignition timing in the cylinder, with the result that the rotation time becomes long and the value of rotation fluctuation amount ΔNe becomes large. Accordingly, based on rotation fluctuation amount ΔNe, controller 60 determines whether or not misfire has occurred, for example.

On the other hand, rotation fluctuation amount ΔNe of each cylinder includes an erroneous component. This results from tolerances of output shaft 116 and bearing thereof or a compression difference between the cylinders. Hence, for example, even if output shaft 116 is rotated at a certain rotation speed with fuel injection being stopped in all the cylinders, rotation fluctuation amount ΔNe of each cylinder may not become zero. Therefore, in order to perform the misfire determination with high precision, it is desirable to correct rotation fluctuation amount ΔNe of each cylinder to eliminate the erroneous component described above. A correction value for rotation fluctuation amount ΔNe of each cylinder is set through a learning process. In the following description, the expression "learning" is defined as calculation and setting of a correction value for rotation fluctuation amount ΔNe of each cylinder through a learning process.

Controller 60 performs the learning process when the fuel injection of engine 12 is stopped (hereinafter, referred to as "fuel cut state"). The learning process is performed by calculating rotation fluctuation amount ΔNe for each cylinder when engine 12 is in the fuel cut state and when engine rotation speed Ne is a predetermined rotation speed Ne(0).

However, when performing the learning process, precision in learning may be deteriorated due to a large influence of disturbance (input from a road surface during traveling on a rough road or the like) transferred from driving wheel 44 to output shaft 116 via transmission 30. The influence of such disturbance is particularly notable when the transmission gear position of transmission 30 is a high-speed gear position. This is because when the transmission gear position of transmission 30 is the high-speed transmission position, inertia at driving wheels 44 becomes larger than inertia at output shaft 116.

In view of this, in the present embodiment, controller 60 is configured to perform the above-described learning process when the gear ratio of transmission 30 is equal to or larger than a threshold value, whereas controller 60 is configured not to perform the above-described learning process when the gear ratio of transmission 30 is smaller than threshold value. In the present embodiment, the threshold value is smaller than the gear ratio corresponding to the second gear position and is larger than the gear ratio corresponding to the third gear position, for example. Hence, controller 60 performs the learning process when the transmission gear position is the second or lower gear position, and does not perform the learning process when the transmission gear position is the third or higher gear position.

Because no learning process is thus performed when the transmission gear position of transmission 30 is the third or higher gear position, precision in learning can be suppressed from being deteriorated.

Hereinafter, the misfire diagnosis and the learning process will be described.

As described above, controller 60 measures a rotation time required for a rotation between predetermined rotation angles for each cylinder. Controller 60 calculates, as rotation fluctuation amount ΔNe, a difference between (i) a rotation time of a cylinder for which detection of misfire is performed and (ii) a rotation of a cylinder ignition order of which is one cylinder before the cylinder for which the detection of misfire is performed. For example, when rotation fluctuation amount ΔNe is larger than a threshold value (hereinafter, referred to as "tentative misfire determination value"), controller 60 tentatively determines that misfire has occurred.

On the other hand, when vehicle 10 is traveling on a rough road, rotation fluctuation amount ΔNe may become larger than the tentative misfire determination value due to input of disturbance from driving wheels 44. Hence, when it is tentatively determined that misfire has occurred, controller 60 determines whether or not rotation fluctuation amounts ΔNe of the other cylinders based on rotation fluctuation amount ΔNe (hereinafter, referred to as "first change pattern") of the cylinder for which the detection of misfire is performed correspond to rotation fluctuation amounts ΔNe (hereinafter, referred to as "second change pattern") of the other cylinders upon occurrence of misfire. When it is determined that the first change pattern corresponds to the second change pattern, controller 60 determines that misfire has occurred in engine 12. The second change pattern is set, for example, in the following manner: rotation fluctuation amounts ΔNe of the other cylinders upon occurrence of misfire in the cylinder for which the detection of misfire is performed are measured through an experiment or the like. The second change pattern is stored in advance in a storage area of controller 60, such as a memory.

By comparing the first change pattern with the second change pattern in this way, controller 60 determines whether rotation fluctuation amount ΔNe became larger than the threshold value due to occurrence of misfire or due to traveling of vehicle 10 on a rough road.

Figure 6:
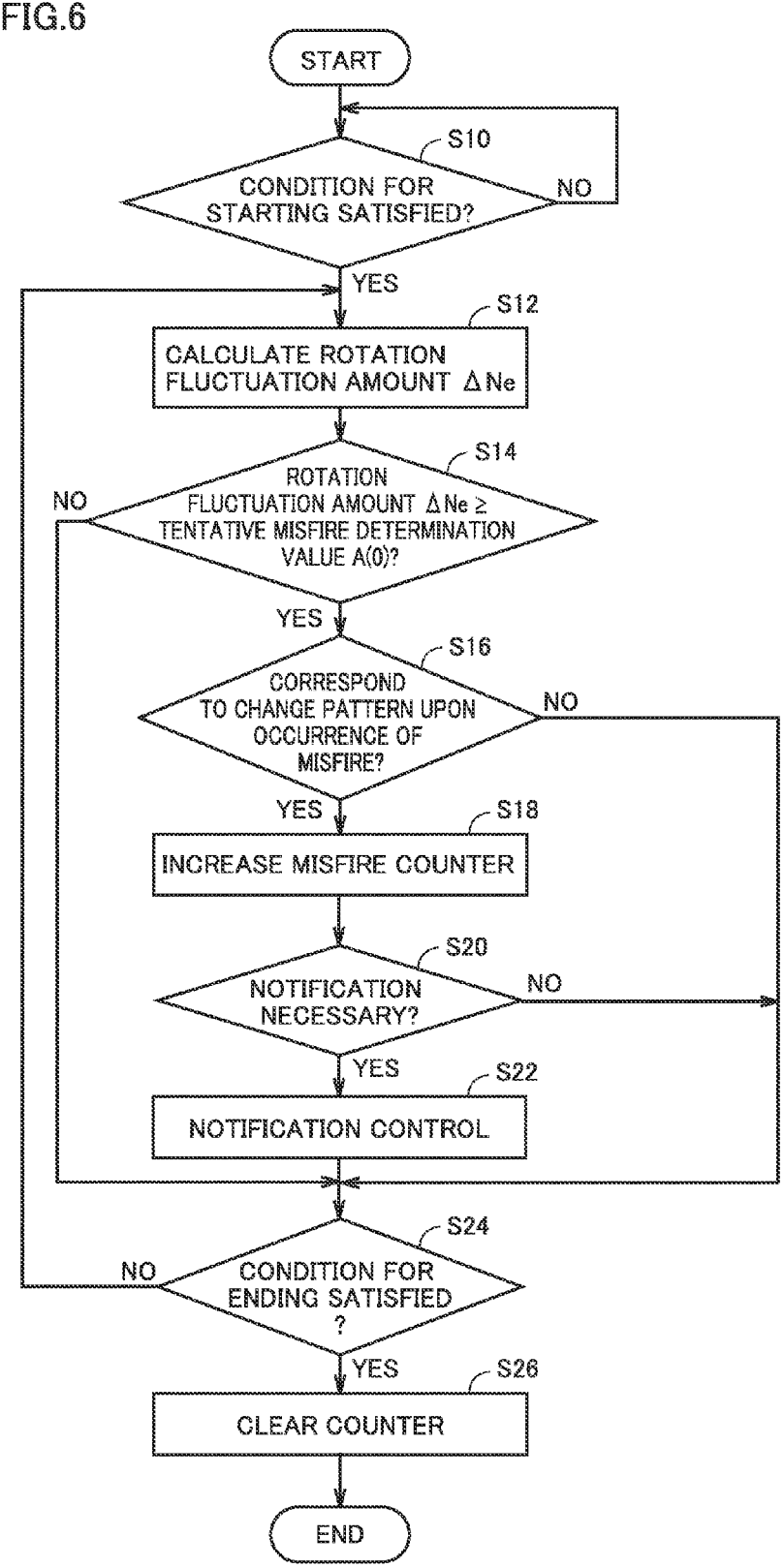
FIG. 6 is a flowchart showing a misfire determination process performed by the controller.

With reference to FIG. 6, the following describes a flowchart of the misfire determination process performed by controller 60 in the present embodiment.

In a step (hereinafter, the term "step" will be abbreviated as "S") 10, controller 60 determines whether or not a condition for starting the misfire determination process is satisfied.

The condition for starting the misfire determination is such a condition that the state of engine 12 is suitable for misfire determination (determination can be made with appropriate precision). For example, the condition for starting the misfire determination is such a condition that engine rotation speed Ne and engine load factor (or amount of intake air) at present are in a predetermined region. The predetermined region is such a region that the lower limit value of the engine load factor is increased as engine rotation speed Ne is increased, for example. The predetermined region may be set appropriately by an experiment or the like. For example, when engine rotation speed Ne and engine load factor at present are in the predetermined region, controller 60 determines that the condition for starting the misfire determination is satisfied.

When the condition for starting the misfire determination is satisfied (YES in S10), the process is transferred to S12. Otherwise (NO in S10), the process is returned to S10.

In S12, controller 60 calculates rotation fluctuation amount ΔNe of engine 12. For example, controller 60 measures a rotation time in which the rotation angle of output shaft 116 detected by crank angle sensor 11 is changed from a first rotation angle to a second rotation angle, which is advanced from the first rotation angle by a predetermined rotation angle amount. In the present embodiment, the predetermined rotation angle amount is 30° CA (Crank Angle), for example. In the description below, a rotation time T30 represents a time required for output shaft 116 to rotate by 30° CA.

For example, controller 60 assumes, as a starting point (i.e., first rotation angle), a predetermined rotation angle based on TDC (Top Dead Center) or BDC (Bottom Dead Center) of each cylinder as a reference, and measures a first rotation time T30(1) required for a rotation to a second rotation angle, which is advanced by 30° CA therefrom. In the present embodiment, it is assumed that the predetermined rotation angle refers to a location rotated by 60° CA from the rotation angle corresponding to the TDC of each cylinder; however, the predetermined rotation angle is not particularly limited to this. The predetermined rotation angle may be a rotation angle after an ignition timing.

Controller 60 calculates, as rotation fluctuation amount ΔNe of engine 12, a difference (T30(1)−T30(2)) between first rotation time T30(1) and second rotation time T30(2) corresponding to a cylinder ignition order of which is one cylinder before the cylinder corresponding to first rotation time T30(1).

For example, it is assumed that engine 12 is an in-line 4-cylinder engine in which four cylinders, i.e., first to fourth cylinders are provided in line. Moreover, it is also assumed that engine 12 is controlled to ignite the first cylinder, the third cylinder, the fourth cylinder, and the second cylinder in this order.

For example, when first rotation time T30(1) corresponding to the third cylinder is measured, controller 60 calculates, as rotation fluctuation amount ΔNe, a difference (T30(1)−T30(2)) between first rotation time T(30) and second rotation time T30(2) of the first cylinder, ignition order of which is one cylinder before the third cylinder. Since engine 12 is a 4-cylinder engine, second rotation time T30(2) is a rotation time T30 preceding first rotation time T30(1) by a time corresponding to 180° CA. It should be noted that for example, when engine 12 is a 6-cylinder engine, second rotation time T30(2) is a rotation time T30 preceding first rotation time T30(1) by a time corresponding to 120° CA.

In S14, controller 60 determines whether or not calculated rotation fluctuation amount ΔNe of engine 12 is equal to or larger than tentative misfire determination value A(0). It should be noted that in the present embodiment, tentative misfire determination value A(0) is illustrated as being determined based on engine rotation speed Ne and amount of intake air; however, tentative misfire determination value A(0) may be a predetermined value.

For example, tentative misfire determination value A(0) may become larger as engine rotation speed Ne becomes larger. Alternatively, tentative misfire determination value A(0) may become smaller as the amount of intake air becomes larger.

When rotation fluctuation amount ΔNe of engine 120 is determined to be equal to or larger than tentative misfire determination value A(0) (YES in S14), the process is transferred to S16. Otherwise (NO in S14), the process is transferred to S24.

In S16, controller 60 determines whether or not the first change pattern of the rotation fluctuation of engine 12 corresponds to the second change pattern of the rotation fluctuation upon occurrence of misfire.

When it is determined that the first change pattern does not correspond to the second change pattern, controller 60 determines that no misfire has occurred in engine 12.

The first change pattern includes rotation fluctuation amount ΔNe of each of the first cylinder and the second cylinder different from the first cylinder, both of which have rotation fluctuation amounts ΔNe equal to or larger than tentative misfire determination value A(0) among the plurality of cylinders. Moreover, the second change pattern includes a change pattern in which upon occurrence of misfire, the rotation fluctuation amount of the second cylinder falls within a range set based on rotation fluctuation amount ΔNe of the first cylinder as a reference.

Figure 7:
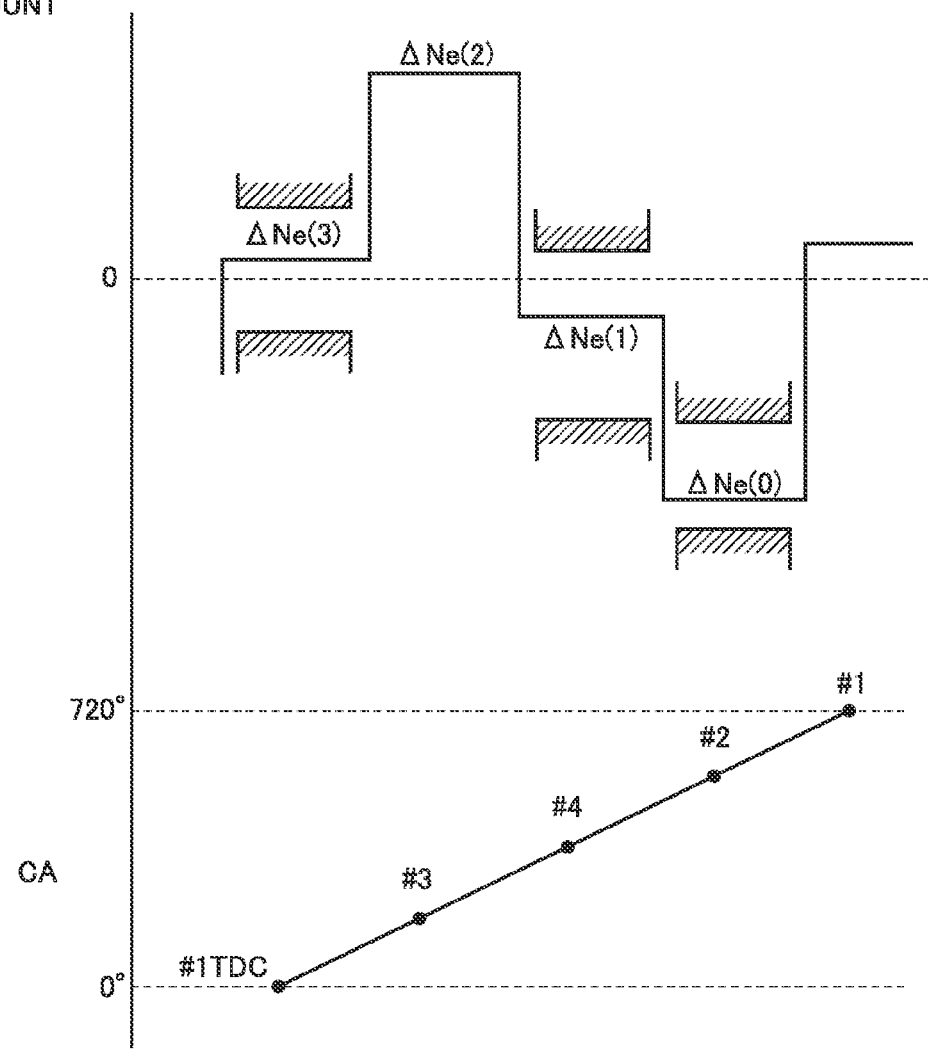
FIG. 7 shows a change pattern of rotation fluctuation of an internal combustion engine.

In the present embodiment, as shown in FIG. 7, the first change pattern includes: rotation fluctuation amount ΔNe(2) of the third cylinder determined to be larger than tentative misfire determination value A(0); rotation fluctuation amount ΔNe(3) of the first cylinder, ignition order of which is one cylinder before the third cylinder; rotation fluctuation amount ΔNe(1) of the fourth cylinder, ignition order of which is one cylinder after the third cylinder; and rotation fluctuation amount ΔNe(0) of the second cylinder, ignition order of which is two cylinders after the third cylinder.

Controller 60 determines whether or not the first change pattern including ΔNe(0), ΔNe(1), ΔNe(2), and ΔNe(3) corresponds to the second change pattern upon occurrence of misfire.

Specifically, controller 60 determines whether or not the following determination conditions are satisfied: $\Delta Ne(0) < 0$, $A \leq |\Delta Ne(0)/\Delta Ne(2)| \leq B$, $-C \leq \Delta Ne(3)/\Delta Ne(2) \leq +C$, and $-D \leq \Delta Ne(1)/\Delta Ne(2) \leq +D$. It should be noted that A, B, C, and D are assumed to be values larger than zero.

When these relations are established, it is indicated that each of ΔNe(0), ΔNe(1), and ΔNe(3) is a value falling within the predetermined range that is based on ΔNe(2) as a reference.

For example, as shown in FIG. 7, when each of ΔNe(0), ΔNe(1), and ΔNe(3) falls within the range between the upper limit value and the lower limit value as based on the above-described relations, controller 60 determines that the first change pattern corresponds to the second change pattern. That is, controller 60 determines that misfire has occurred in engine 12.

In the present embodiment, as one example, it has been illustrated that whether or not misfire has occurred is determined based on rotation fluctuation amount ΔNe(2), which is a difference (T30(1)–T30(2)) between first rotation time T30(1) of the third cylinder and second rotation time T30(2) of the first cylinder, ignition order of which is one cylinder before the third cylinder. However, likewise, whether or not misfire has occurred is also determined based on a difference between rotation fluctuation amounts of other cylinders as a reference. Examples of the difference between the rotation fluctuation amounts of the other cylinders include: a difference between rotation time T30 of the fourth cylinder and rotation time T30 of the third cylinder, ignition order of which is one cylinder before the fourth cylinder; a difference between rotation time T30 of the second cylinder and rotation time T30 of the fourth cylinder, ignition order of which is one cylinder before the second cylinder; or a difference between rotation time T30 of the first cylinder and rotation time T30 of the second cylinder.

Turning back to FIG. 6, when it is determined that the first change pattern of the rotation fluctuation of engine 120 corresponds to the second change pattern of the rotation fluctuation upon occurrence of misfire (YES in S16), the process is transferred to S18. Otherwise (NO in S16), the process is transferred to S24.

In S18, controller 60 increases a misfire counter by a predetermined value (for example, "1"). It should be noted that in the present embodiment, the misfire counter is illustrated as indication of the total of misfires having occurred in all the cylinders; however, the misfire counter may be provided for each cylinder if a cylinder having misfire occurred therein can be specified.

In S20, based on the misfire counter, controller 60 determines whether or not it is necessary to notify the driver that misfire has occurred in engine 12. For example, when the misfire counter becomes equal to or larger than the threshold value, controller 60 determines that the notification is necessary. When it is determined that the notification is necessary (YES in S20), the process is transferred to S22. Otherwise (NO in S20), the process is transferred to S24.

In S22, controller 60 performs notification control to notify the occurrence of misfire in engine 12 to the driver using a display device, a warning light, a speaker or the like.

In S24, controller 60 determines whether or not a condition for ending the misfire determination is satisfied. For example, the condition for ending is such a condition that output shaft 116 of engine 12 has been rotated by a predetermined number of times after the condition for starting the misfire determination is satisfied. When it is determined that the condition for ending the misfire determination is satisfied (YES in S24), the process is transferred to S26. Otherwise (NO in S24), the process is transferred to S12.

In S26, controller 60 clears the misfire counter to reset it to an initial value (for example, "0").

Hereinafter, the learning process will be described more in detail.

As described above, controller 60 performs the learning process in a state (hereinafter, referred to as "fuel cut state") in which fuel injection in engine 12 is stopped. The learning process is performed by calculating rotation fluctuation amount ΔNe for each cylinder when engine 12 is in the fuel cut state and engine rotation speed Ne is predetermined rotation speed Ne(0). In the present embodiment, controller 60 uses motor generator MG1 to adjust engine rotation speed Ne to be predetermined rotation speed Ne(0).

When a predetermined condition is satisfied, controller 60 controls engine 12 to bring it into the fuel cut state. The predetermined condition includes: a condition in which the accelerator pedal is in an accelerator off state; a condition in which engine rotation speed Ne is higher than the threshold value; and the like, for example. However, the predetermined condition is not particularly limited to these conditions. The threshold value is a value larger than the value of the idle rotation speed, for example.

Controller 60 repeats the calculation of rotation fluctuation amount ΔNe for each cylinder for the predetermined number of times, thus calculating the predetermined number of rotation fluctuation amounts ΔNe for each cylinder. Controller 60 calculates the average value of the predetermined number of calculated rotation fluctuation amounts ΔNe for each cylinder. Controller 60 sets the average value of rotation fluctuation amounts ΔNe for each cylinder as correction value ΔNe_c for the cylinder, and then completes the learning process. In the present embodiment, it is assumed that the predetermined number of times is 20 times and the predetermined number is 20; however, the number of times is not particularly limited to 20 times and the number is not particularly limited to 20.

When the learning process is completed, controller 60 subtracts correction value ΔNe_c from calculated rotation fluctuation amount ΔNe, thereby correcting rotation fluctuation amount ΔNe. Based on corrected rotation fluctuation amount ΔNe, controller 60 determines whether or not misfire has occurred in engine 12 as described above.

By correcting rotation fluctuation amount ΔNe for each cylinder using correction value ΔNe_c for the cylinder, it is possible to eliminate a component of the rotation fluctuation amount for the cylinder caused by tolerances of components included in output shaft 116 of engine 12 or a compression difference between the cylinders. Accordingly, precision in rotation fluctuation amount ΔNe for each cylinder is improved, whereby whether or not misfire has occurred can be determined with high precision.

For example, controller 60 performs the learning process once whenever one trip is performed. By calculating correction value ΔNe_c for each cylinder whenever one trip is performed, whether or not misfire has occurred can be determined with high precision without being affected by deterioration with passage of time.

It should be noted that the term "one trip" refers to a period from (i) start of the system of vehicle 10 in response to the user's starting operation (a time at which electric devices included in vehicle 10 become operational) to (ii) stop of the system of vehicle 10 in response to the user's stopping operation (a time at which supply of electric power to the electric devices included in vehicle 10 is stopped). The starting operation is, for example, an operation of pushing a start switch (not shown) with the system of the vehicle being nonoperational. The stopping operation is, for example, an operation of pushing the start switch or maintaining the start switch to be pushed for a predetermined time or longer with the system of vehicle 10 being operational.

It should be noted that controller 60 may correct rotation fluctuation amount ΔNe using correction value ΔNe_c calculated in the previous trip before completing the learning process. Alternatively, controller 60 may determine whether or not misfire has occurred in engine 12 without correcting rotation fluctuation amount ΔNe.

Figure 8:
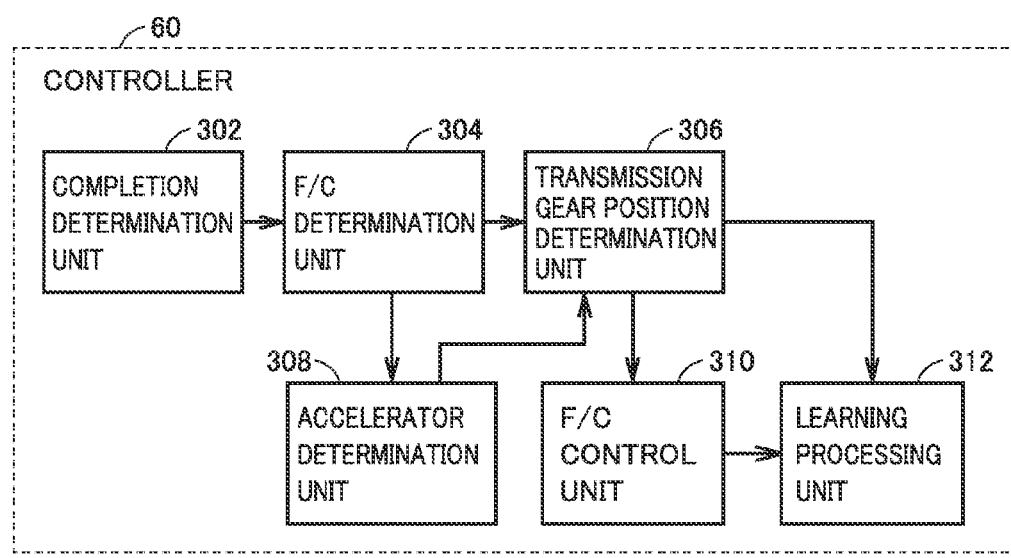
FIG. 8 is a function block diagram of the controller.

FIG. 8 shows a function block diagram associated with the learning process performed by controller 60 included in vehicle 10 according to the present embodiment. Controller 60 includes a completion determination unit 302, an F/C determination unit 304, a transmission gear position determination unit 306, an accelerator determination unit 308, an F/C control unit 310, and a learning processing unit 312. It should be noted that these configurations may be implemented by software such as a program, or may be implemented by hardware. It should be also noted that these configurations may be represented by at least one of engine ECU 62, MG-ECU 64, battery ECU 66, ECT-ECU 68, and HV-ECU 70 described above. For example, these configurations may be implemented only by HV-ECU 70 or may be implemented by engine ECU 62 and HV-ECU 70.

Completion determination unit 302 determines whether or not the learning process has been completed in the present trip. When a learning completion flag, which indicates that the learning has been completed, is on, completion determination unit 302 determines that the learning process has been completed in the present trip.

When completion determination unit 302 determines that the learning process has not been completed in the present trip, F/C determination unit 304 determines whether or not engine 12 is in the fuel cut state. For example, F/C determination unit 304 may determine whether or not engine 12 is in the fuel cut state based on a command value for fuel injection amount, or may determine whether or not engine 12 is in the fuel cut state based on a flag that is set to be on when the engine is brought into the fuel cut state.

When F/C determination unit 304 determines that engine 12 is in the fuel cut state, transmission gear position determination unit 306 determines whether or not the transmission gear position of the transmission is a predetermined transmission gear position or a lower transmission gear position. Alternatively, when accelerator determination unit 308 described below determines that the accelerator pedal is in the accelerator off state, transmission gear position determination unit 306 determines whether or not the transmission gear position of the transmission is the second or lower gear position. For example, based on the engagement state of each of clutches C1 to C3 and brakes B1, B2, transmission gear position determination unit 306 may determine whether or not the present transmission gear position is the second or lower gear position. Alternatively, for example, based on a ratio (gear ratio) of the input shaft rotation speed and the output shaft rotation speed of transmission 30, transmission gear position determination unit 306 may determine whether or not the transmission gear position is the second or lower gear position.

When F/C determination unit 304 determines that engine 12 is not in the fuel cut state, accelerator determination unit 308 determines whether or not the accelerator pedal is in the accelerator off state. Specifically, accelerator determination unit 308 determines whether or not the accelerator position is equal to or smaller than a predetermined position indicating substantially zero. When the accelerator position is equal to or smaller than the predetermined position, accelerator determination unit 308 determines that the accelerator pedal is in the accelerator off state. When it is determined that the accelerator pedal is in the accelerator off state, accelerator determination unit 308 sets the accelerator determination flag to be on.

F/C control unit 310 stops fuel injection into engine 12 when F/C determination unit 304 determines that engine 12 is not in the fuel cut state, accelerator determination unit 308 determines that the accelerator pedal is in the accelerator off state, and transmission gear position determination unit 306 determines that the transmission gear position is the second or lower gear position. Moreover, for example, F/C control unit 310 may cancel the stop of fuel injection when the learning completion flag is turned on as a result of completion of the learning process or when the learning process is interrupted.

When F/C determination unit 304 determines that engine 12 is in the fuel cut state, learning processing unit 312 sets the learning execution flag to be on. Alternatively, learning processing unit 312 sets the learning execution flag to be on when F/C control unit 310 brings engine 12 into the fuel cut state. Learning processing unit 312 performs the learning process when the learning execution flag is on.

As described above, learning processing unit 312 controls motor generator MG1 such that engine rotation speed Ne becomes predetermined rotation speed Ne(0). For example, learning processing unit 312 may perform feedback control of motor generator MG1 with predetermined rotation speed Ne(0) being regarded as a target rotation speed. Learning processing unit 312 calculates the predetermined number of rotation fluctuation amounts ΔNe for each cylinder. Learning processing unit 312 calculates the average value of the predetermined number of rotation fluctuation amounts ΔNe for each cylinder. Learning processing unit 312 sets the calculated average value of rotation fluctuation amounts ΔNe for the cylinder as correction value ΔNe_c for the cylinder. After completion of the learning process (that is, after setting correction value ΔNe_c for each cylinder), learning processing unit 312 sets the learning completion flag to be on.

Figure 9:
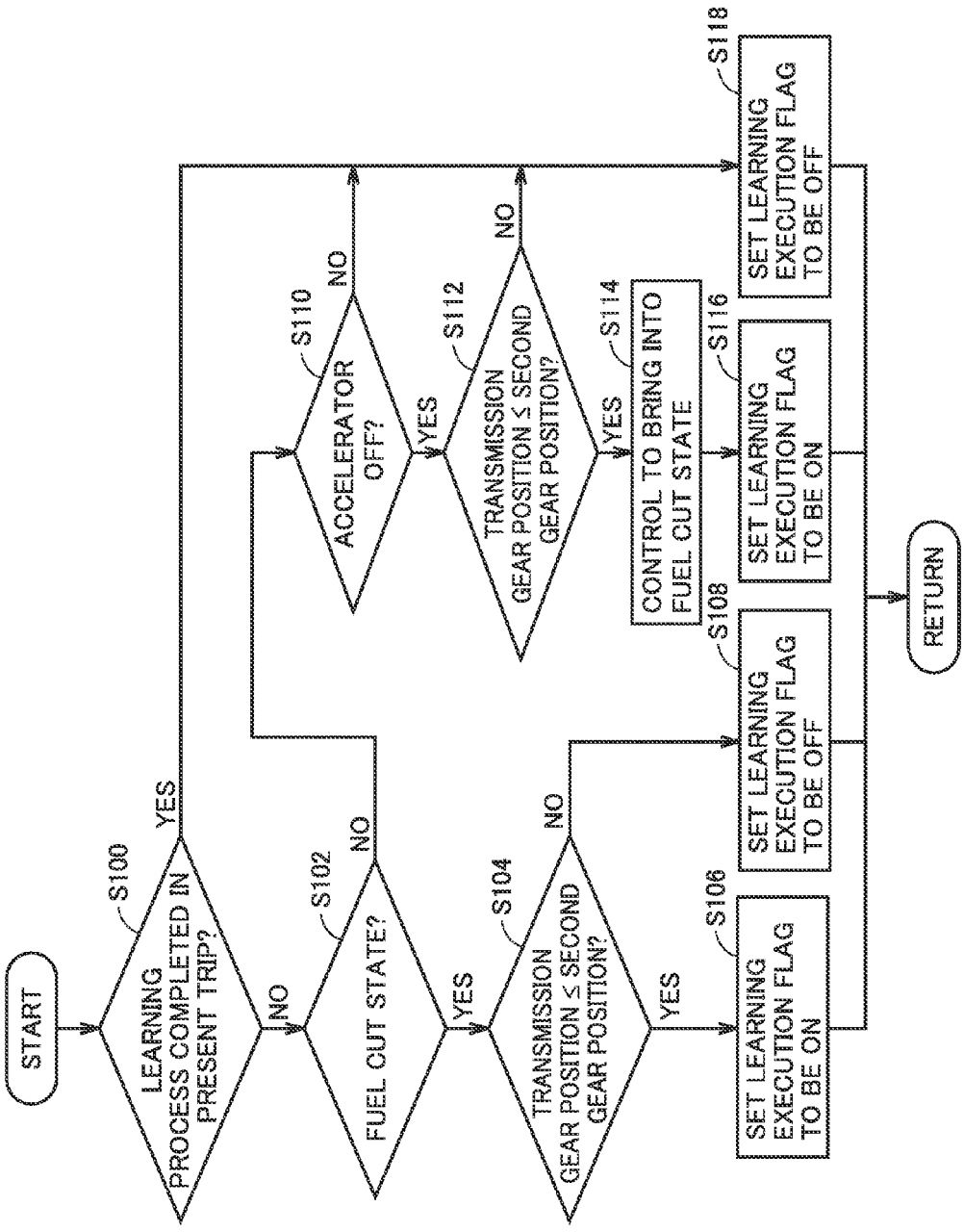
FIG. 9 is a flowchart showing a control process performed by the controller.

With reference to FIG. 9, the following describes a control process performed by controller 60 included in vehicle 10 according to the present embodiment.

In a step (the term "step" is hereinafter abbreviated as "S") 100, controller 60 determines whether or not the learning process has been completed in the present trip. When it is determined that the learning process has been completed in the present trip (YES in S100), the process is transferred to S118. Otherwise (NO in S100), the process is transferred to S102.

In S102, controller 60 determines whether or not engine 12 is in the fuel cut state. When it is determined that engine 12 is in the fuel cut state (YES in S102), the process is transferred to S104. Otherwise (NO in S102), the process is transferred to S110.

In S104, controller 60 determines whether or not the transmission gear position is the second or lower gear position. When it is determined that the transmission gear position is the second or lower gear position (YES in S104), the process is transferred to S106. Otherwise (NO in S104), the process is transferred to S108.

In S106, controller 60 sets the learning execution flag to be on. In S108, when the learning execution flag is on, controller 60 sets the learning execution flag to be off, whereas when the learning execution flag is off, controller 60 maintains the learning execution flag to be off.

In S110, controller 60 determines whether or not the accelerator pedal is in the accelerator off state. When controller 60 determines that the accelerator pedal is in the accelerator off state (YES in S110), the process is transferred to S112. Otherwise (NO in S110), the process is transferred to S118.

In S112, controller 60 determines whether or not the transmission gear position is the second or lower gear position. When it is determined that the transmission gear position is the second or lower gear position (YES in S112), the process is transferred to S114. Otherwise (NO in S112), the process is transferred to S118.

In S114, controller 60 controls engine 12 to be brought into the fuel cut state. In S116, controller 60 sets the learning execution flag to be on. In S118, when the learning execution flag is on, controller 60 sets the learning execution flag to be off, whereas when the learning execution flag is off, controller 60 maintains the learning execution flag to be off.

With reference to FIG. 10, the following describes the learning process performed by controller 60 included in vehicle 10 according to the present embodiment.

In S200, controller 60 determines whether or not the learning execution flag is on. When it is determined that the learning execution flag is on (YES in S200), the process is transferred to S202. Otherwise (NO in S200), this process is ended.

In S202, controller 60 performs motoring, which is to rotate output shaft 116 of engine 12 using motor generator MG1 with predetermined rotation speed Ne(0) being regarded as a target rotation speed of the engine rotation speed.

In S204, controller 60 calculates rotation fluctuation amount ΔNe for each cylinder. In S206, controller 60 determines whether or not the predetermined number of rotation fluctuation amounts ΔNe for each cylinder have been calculated. When it is determined that the predetermined number of rotation fluctuation amounts ΔNe for each cylinder have been calculated (YES in S206), the process is transferred to S208. Otherwise (NO in S206), the process is returned to S204.

In S208, controller 60 calculates the average value of rotation fluctuation amounts ΔNe for each cylinder as correction value ΔNe_c for the cylinder. In S210, controller 60 sets the learning completion flag to be on.

With reference to FIG. 11 and FIG. 12, the following describes the operation of controller 60 included in vehicle 10 according to the present embodiment based on the above structure and flowchart.

Each of the vertical axes of FIG. 11 and FIG. 12 represents: the transmission gear position; the state of the accelerator pedal; whether or not engine 12 is in the fuel cut state; the state of the learning execution flag; and the state of the learning completion flag. Each of the horizontal axes of FIG. 11 and FIG. 12 represents time.

As shown in the solid line of the uppermost graph of FIG. 11, it is assumed that the transmission gear position is the third gear position, for example. Furthermore, as shown in the second graph from the uppermost side in FIG. 11, it is assumed that the accelerator pedal is in the accelerator off state. Furthermore, as shown in the third graph from the uppermost side in FIG. 11, it is assumed that engine 12 is not in the fuel cut state. Furthermore, as shown in the fourth graph from the uppermost side in FIG. 11 and the lowermost graph in FIG. 11, it is assumed that the learning execution flag and the learning completion flag are both off.

For example, when shifting is performed from the third gear position to the second gear position at a time T(0) and the condition for fuel cut is satisfied, fuel injection in engine 12 is stopped and engine 12 is brought into the fuel cut state. On this occasion, the learning process is not completed (NO in S100), engine 12 is in the fuel cut state (YES in S102), and the transmission gear position is the second gear position (YES in S104). Accordingly, the learning execution flag is set to be on (S106).

Since the learning execution flag is set to be on (YES in S200), motoring is performed (S202). Then, when engine rotation speed Ne is brought into predetermined rotation speed Ne(0), rotation fluctuation amount ΔNe for each cylinder is calculated (S204). When the predetermined number of rotation fluctuation amounts ΔNe are calculated (YES in S206), the average value of rotation fluctuation amounts ΔNe for each cylinder is calculated as correction value ΔNe_c (S208). When correction value ΔNe_c is calculated at a time T(1), the learning completion flag is set to be on (S210).

When the learning completion flag is set to be on at time T(1) (YES in S100), the learning execution flag is set to be off (S118). When the accelerator pedal is brought into the accelerator on state at a time T(2), the fuel cut state is canceled, for example.

On the other hand, as shown in the broken line of the uppermost graph in FIG. 11, when the transmission gear position is maintained to be the third gear position at time T(0), the transmission gear position is the third gear position (NO in S104) even if engine 12 is brought into the fuel cut state because the condition for fuel cut is satisfied at time T(0). Accordingly, as shown in the broken line of the fourth graph from the uppermost side in FIG. 11, the learning execution flag is not turned on (NO in S200), with the result that no learning process is performed. Therefore, as shown in the broken line of the lowermost graph in FIG. 11, the learning completion flag is also maintained to be off (S108).

Next, for example, it is assumed that the transmission gear position is the second gear position as shown in the solid line of the uppermost graph in FIG. 12. Furthermore, as shown in the second graph from the uppermost side in FIG. 12, it is assumed that the accelerator pedal is in the accelerator on state. Furthermore, as shown in the third graph from the uppermost side in FIG. 12, it is assumed that engine 12 is not in the fuel cut state. Furthermore, as shown in the fourth graph from the uppermost side in FIG. 12 and the lowermost graph in FIG. 12, it is assumed that the learning execution flag and the learning completion flag are both off.

Even though the learning completion flag is off (NO in S100), the engine is not in the fuel cut state (NO in S102) and the accelerator pedal is in the accelerator on state (NO in S110). Accordingly, the learning execution flag remains to be off (S118).

When the vehicle is brought into the accelerator off state at a time T(3) (YES in S110), the transmission gear position is the second gear position (YES in S112), so that engine 12 is controlled to be brought into the fuel cut state (S114). Further, the learning execution flag is set to be on (S116).

Since the learning execution flag is set to be on (YES in S200), motoring is performed (S202). Then, when engine rotation speed Ne is brought into predetermined rotation speed Ne(0), rotation fluctuation amount ΔNe for each cylinder is calculated (S204). When the predetermined number of rotation fluctuation amounts ΔNe are calculated (YES in S206), the average value of rotation fluctuation amounts ΔNe for each cylinder is calculated as correction value ΔNe_c (S208). When correction value ΔNe_c is calculated at a time T(4), the learning completion flag is set to be on (S210).

When the learning completion flag is set to be on at time T(4) (YES in S100), the learning execution flag is set to be off (S118) and the fuel cut state is canceled.

As described above, according to vehicle 10 according to the present embodiment, the learning process is not performed when the transmission gear position is the second or higher gear position with which an influence of disturbance from driving wheels 44 becomes large. Hence, precision in learning can be suppressed from being deteriorated. Accordingly, there can be provided a vehicle in which precision in learning about misfire determination of the engine is suppressed from being deteriorated.

Further, even when the learning process is not completed and engine 12 is not in the fuel cut state, controller 60 controls engine 12 to be in the fuel cut state and performs the learning process under conditions that the accelerator pedal is in the accelerator off state and the transmission gear position is the second or lower gear position. Thus, when the gear ratio of transmission 30 is equal to or larger than the threshold value, controller 60 controls the operation of engine 12 in accordance with a fuel injection stopping condition, which is set such that fuel injection is more likely to be stopped as compared with the case where the gear ratio of transmission 30 is smaller than the threshold value. This provides more opportunities for learning.

Hereinafter, a modification will be described.

In the present embodiment, it has been illustrated that the second or lower gear position is the transmission gear position for which the learning process is performed; however, it is not particularly limited to the second gear position as long as the transmission gear position is any transmission gear position with which an influence of disturbance transferred from driving wheels 44 to engine 12 is large. The transmission gear position with which the influence of the disturbance is large can be set appropriately through an experiment or the like, for example.

Further, although the configuration shown in FIG. 1 has been described as one example of the configuration of vehicle 10 in the present embodiment, vehicle 10 is not particularly limited to the configuration shown in FIG. 1 and may have any configuration as long as vehicle 10 is at least configured such that transmission 30 is provided between engine 12 and driving wheel 44 and is configured to include motor generator MG1 capable of rotating output shaft 116 of engine 12 at the predetermined rotation speed. For example, vehicle 10 may be a vehicle (non-hybrid vehicle) configured such that engine 12 is connected to transmission 30 via a torque converter or the like and a motor is provided which at least has a function as a starter capable of rotating output shaft 116 of engine 12.

Further, although the configuration shown in FIG. 4 has been illustrated as one example of transmission 30 in the present embodiment, transmission 30 may have any configuration as long as transmission 30 is at least configured to be capable of changing the gear ratio, and may be, for example, a belt type stepless transmission. In this case, controller 60 may be configured to perform the learning process when the gear ratio of transmission 30 is larger than the threshold value, and may be configured not to perform the learning process when the gear ratio is smaller than the threshold value.

Further, in the present embodiment, it has been illustrated that even when the learning process is not completed and engine 12 is not in the fuel cut state, controller 60 controls engine 12 to be brought into the fuel cut state under conditions that the accelerator pedal is in the accelerator off state and the transmission gear position is the second or lower gear position. However, for example, the fuel cut condition for the case where the transmission gear position is the second or lower gear position may be any condition as long as engine 12 is more likely to be brought into the fuel cut state as compared with the fuel cut condition for the case where the transmission gear position is the third or higher gear position. For example, in the case where transition is made to the fuel cut state under a condition that engine rotation speed Ne is larger than the threshold value, the fuel cut condition may be set such that threshold value Ne1 for the case where the transmission gear position is the second or lower gear position is smaller than threshold value Ne2 for the case where the transmission gear position is the third or higher gear position.

Figure 13:
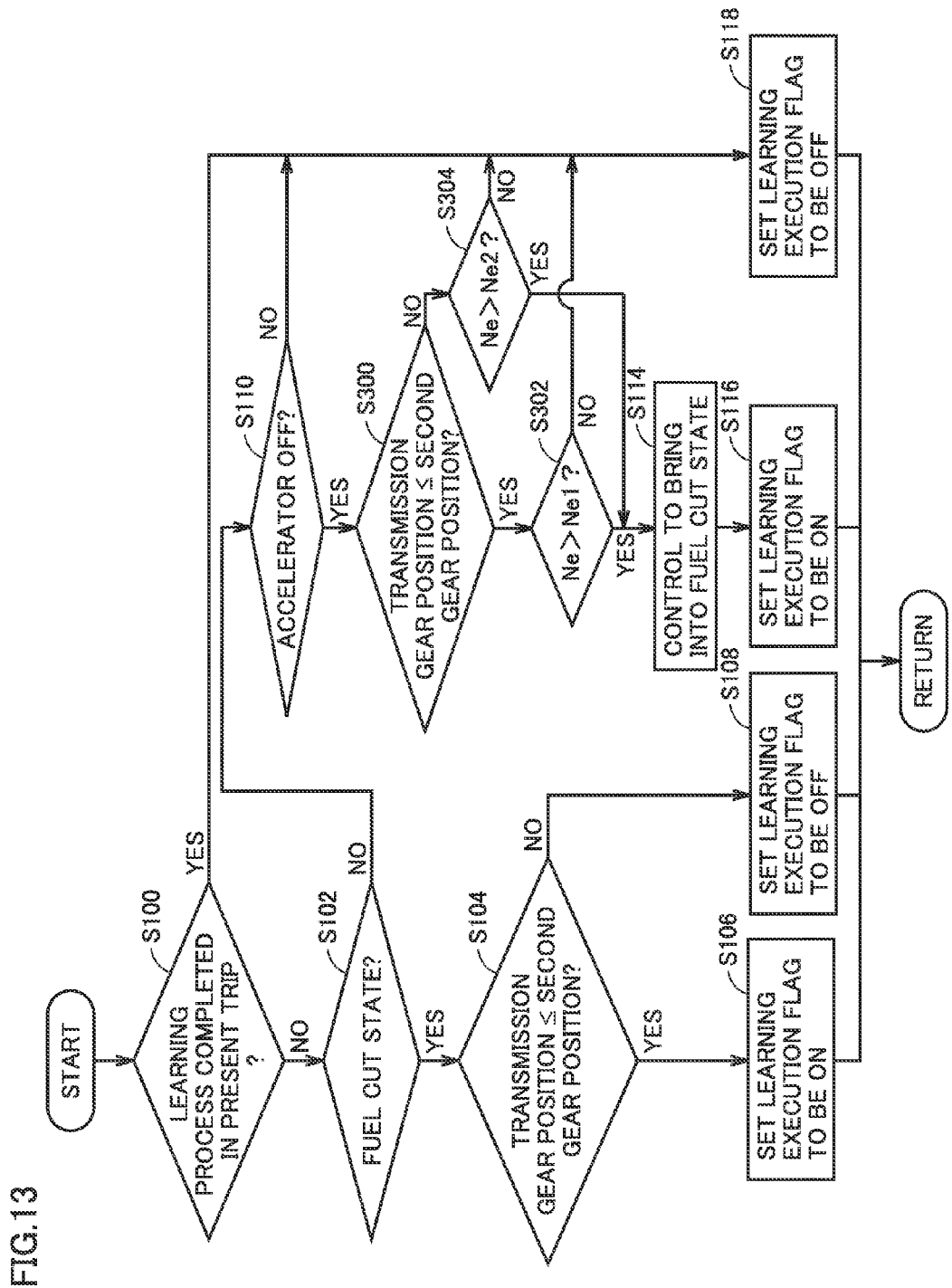
FIG. 13 is a flowchart showing the control process performed by a controller according to a modification.

Specifically, controller 60 may be configured to perform the control process shown in FIG. 13. It should be noted that the processes of S100 to S116 in the flowchart of FIG. 13 are the same as the processes of S100 to S116 in the flowchart of FIG. 9 except the process of S112. Hence, the detailed description thereof is not repeated.

In S300, controller 60 determines whether or not the transmission gear position is the second or lower gear position. When it is determined that the transmission gear position is the second or lower position (YES in S300), the process is transferred to S302. Otherwise (NO in S300), the process is transferred to S304.

In S302, controller 60 determines whether or not engine rotation speed Ne is larger than threshold value Ne1. When it is determined that engine rotation speed Ne is larger than threshold value Ne1 (YES in S302), the process is transferred to S114. Otherwise (NO in S302), the process is transferred to S118.

In S304, controller 60 determines whether or not engine rotation speed Ne is larger than threshold value Ne2. When it is determined that engine rotation speed Ne is larger than threshold value Ne2 (YES in S304), the process is transferred to S114. Otherwise (NO in S304), the process is transferred to S118.

In this way, the fuel cut condition for the case where the transmission gear position is the second or lower gear position can be set such that the engine is more likely to be brought into the fuel cut state as compared with the fuel cut condition for the case where the transmission gear position is the third or higher gear position. This provides more opportunities for learning.

It should be noted that the whole of the modification described above may be implemented or parts of the modification may be implemented in combination.

Although the present disclosure has been described and illustrated in detail, it is clearly understood that the same is by way of illustration and example only and is not to be taken by way of limitation, the scope of the present subject matter being interpreted by the terms of the appended claims.

What is claimed is:

1. A vehicle comprising:
   an engine having a plurality of cylinders;
   a motor configured to rotate an output shaft of the engine;
   a transmission provided between the engine and a driving wheel;
   a detector configured to detect a rotation angle of an output shaft of the engine; and
   a controller configured to (i) control an operation of the engine and an operation of the motor, (ii) calculate a deviation between a first rotation time and a second rotation time as a rotation fluctuation amount, and (iii) determine whether or not misfire has occurred in the engine in accordance with whether or not the calculated rotation fluctuation amount is larger than a misfire determination value,
   the first rotation time being a time required for the output shaft to rotate by a predetermined angle after an ignition timing of the first cylinder of the engine during an operation of the engine, the second rotation time being a time required for the output shaft to rotate by the predetermined angle after an ignition timing of a second cylinder, the second cylinder being a cylinder ignition order of which is one cylinder before the first cylinder, in response to a gear ratio of the transmission being equal to or larger than a threshold value, the controller being configured to perform a learning process in which the deviation between the first rotation time and the second rotation time is set as a correction value for the rotation fluctuation amount, and in which the deviation is calculated while fuel injection is stopped in the engine, in response to the gear ratio being smaller than the threshold value, the controller being configured not to perform the learning process.

2. The vehicle according to claim 1, wherein when the gear ratio is equal to or larger than the threshold value, the controller is configured to set a condition for stopping the fuel injection such that the fuel injection is more likely to be stopped as compared with a case where the gear ratio is smaller than the threshold value.

3. A method for controlling a vehicle, the vehicle including an engine having a plurality of cylinders, a motor configured to rotate an output shaft of the engine, a transmission provided between the engine and a driving wheel, and a detector configured to detect a rotation angle of an output shaft of the engine, the method comprising the steps of:
controlling an operation of the engine and an operation of the motor;
calculating a deviation between a first rotation time and a second rotation time as a rotation fluctuation amount; and
determining whether or not misfire has occurred in the engine in accordance with whether or not the calculated rotation fluctuation amount is larger than a misfire determination value, the first rotation time being a time required for the output shaft to rotate by a predetermined angle after an ignition timing of the first cylinder of the engine during an operation of the engine, the second rotation time being a time required for the output shaft to rotate by the predetermined angle after an ignition timing of a second cylinder, the second cylinder being a cylinder ignition order of which is one cylinder before the first cylinder, the method further comprising the steps of:
performing, in response to a gear ratio of the transmission being equal to or larger than a threshold value, a learning process in which the deviation between the first rotation time and the second rotation time is set as a correction value for the rotation fluctuation amount, and in which the deviation is calculated while fuel injection is stopped in the engine; and
performing no learning process in response to the gear ratio being smaller than the threshold value.

4. The method for controlling a vehicle according to claim 3, wherein the method further comprises the step of setting, when the gear ratio is equal to or larger than the threshold value, a condition for stopping the fuel injection such that the fuel injection is more likely to be stopped as compared with a case where the gear ratio is smaller than the threshold value.

* * * * *